US010634590B2

United States Patent
Scott et al.

(10) Patent No.: US 10,634,590 B2
(45) Date of Patent: Apr. 28, 2020

(54) IHC, TISSUE SLIDE FLUID EXCHANGE DISPOSABLE AND SYSTEM

(71) Applicant: EMD Millipore Corporation, Burlington, MA (US)

(72) Inventors: Chris Scott, Westford, MA (US); Paul Sydlowski, Danvers, MA (US); John Doyle, Kensington, NH (US); Ryan Amara, Tewksbury, MA (US); Libby Kellard, Danvers, MA (US); Sara Gutierrez, Danvers, MA (US); Marc Emerick, Arlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 573 days.

(21) Appl. No.: 14/618,007

(22) Filed: Feb. 10, 2015

(65) Prior Publication Data

US 2015/0260621 A1    Sep. 17, 2015

Related U.S. Application Data

(60) Provisional application No. 61/951,135, filed on Mar. 11, 2014, provisional application No. 62/039,082, filed on Aug. 19, 2014.

(51) Int. Cl.
*G01N 1/31* (2006.01)
*B01L 3/00* (2006.01)
*B01L 9/00* (2006.01)

(52) U.S. Cl.
CPC .......... *G01N 1/312* (2013.01); *B01L 3/50853* (2013.01); *B01L 3/502715* (2013.01);
(Continued)

(58) Field of Classification Search
CPC .... B01L 9/52; B01L 9/527; B01L 2300/0822; G01N 1/312; G01N 2035/00138; G01N 35/00029
(Continued)

(56) References Cited

U.S. PATENT DOCUMENTS

| 4,985,206 A | 1/1991 | Bowman et al. |
| 5,002,736 A | 3/1991 | Babbitt et al. |

(Continued)

FOREIGN PATENT DOCUMENTS

| CN | 1684772 A | 10/2005 |
| CN | 1898022 A | 1/2007 |

(Continued)

OTHER PUBLICATIONS

European communication dated Jan. 28, 2016 in corresponding European patent application No. 15158134.5.
(Continued)

*Primary Examiner* — Jill A Warden
*Assistant Examiner* — Dwayne K Handy
(74) *Attorney, Agent, or Firm* — Nields, Lemack & Frame, LLC

(57) ABSTRACT

Apparatus and method for Immunohistochemistry, including a slide holder assembly fixture, a slide holder, a slide holder frame, and a slide holder frame assembly adapted to be placed in communication with a driving force to draw fluid through the slide holder. The slide holder may include an injection port that allows consistent fluid delivery and recovery, while minimizing the introduction of air bubbles. The slide holder may include a reservoir that allows for filling, soaking, rinsing, flushing, uniform antibody coverage of the tissue and reduces handling time, space, and errors, and one or more sample chambers. The slide orientation in the slide holder allows for visualization of label information and
(Continued)

tissue to confirm adequate antibody coverage. A multi-port frame allows multiple assays to be carried out concurrently, and is removable from a vacuum manifold and allows for easy transport from the vacuum manifold to an incubator/refrigerator and back.

8 Claims, 16 Drawing Sheets

(52) U.S. Cl.
CPC ........... *B01L 9/52* (2013.01); *B01L 2200/026* (2013.01); *B01L 2300/043* (2013.01); *B01L 2300/047* (2013.01); *B01L 2300/0822* (2013.01); *B01L 2300/0877* (2013.01)

(58) Field of Classification Search
USPC ........................................ 422/560, 561, 563
See application file for complete search history.

(56) References Cited

U.S. PATENT DOCUMENTS

| | | |
|---|---|---|
| 5,068,091 A | 11/1991 | Toya |
| 5,192,503 A | 3/1993 | McGrath et al. |
| 5,830,413 A | 11/1998 | Lang et al. |
| 5,945,334 A * | 8/1999 | Besemer ............ B01J 19/0046 422/552 |
| 5,958,760 A * | 9/1999 | Freeman ................ B01L 7/52 356/398 |
| 6,096,271 A | 8/2000 | Bogen et al. |
| 6,162,401 A | 12/2000 | Callaghan |
| 6,218,191 B1 | 4/2001 | Palander |
| 6,358,473 B1 | 3/2002 | Coello et al. |
| 6,623,701 B1 | 9/2003 | Eichele et al. |
| 6,673,620 B1 | 1/2004 | Loeffler et al. |
| 7,368,081 B2 | 5/2008 | Thiem |
| 7,615,371 B2 | 11/2009 | Kram |
| 7,618,807 B2 | 11/2009 | Lemme et al. |
| 7,628,955 B2 | 12/2009 | Kerrod et al. |
| 7,820,381 B2 | 10/2010 | Lemme et al. |
| 8,048,373 B2 | 11/2011 | Reinhardt et al. |
| 8,058,010 B2 | 11/2011 | Erickson et al. |
| 8,460,618 B2 | 6/2013 | Mabuchi et al. |
| 2003/0031602 A1 | 2/2003 | Weselak et al. |
| 2005/0054078 A1 | 3/2005 | Miller et al. |
| 2005/0208529 A1 | 9/2005 | Winther et al. |
| 2006/0171857 A1 | 8/2006 | Stead et al. |
| 2007/0281364 A1 | 12/2007 | Bogen et al. |
| 2008/0081368 A1 | 4/2008 | Bailey et al. |
| 2008/0194034 A1 | 8/2008 | Erickson et al. |
| 2009/0026126 A1 | 1/2009 | Taylor et al. |
| 2009/0026153 A1 | 1/2009 | Kane et al. |
| 2010/0133510 A1 | 6/2010 | Kim et al. |
| 2010/0166612 A1 | 7/2010 | Lehto |
| 2011/0045606 A1 | 2/2011 | Kennedy |
| 2011/0136135 A1 | 6/2011 | Larsen et al. |
| 2011/0150725 A1 | 6/2011 | Angros et al. |
| 2011/0151504 A1 | 6/2011 | Avantsa et al. |
| 2012/0009667 A1 | 1/2012 | Peterson et al. |
| 2012/0201723 A1 | 8/2012 | Loeffler et al. |
| 2012/0286531 A1 | 11/2012 | Hajrovic |
| 2012/0297899 A1 | 11/2012 | Scott et al. |
| 2012/0315189 A1 | 12/2012 | Scott et al. |
| 2015/0198509 A1 | 7/2015 | Williamson, IV et al. |

FOREIGN PATENT DOCUMENTS

| | | |
|---|---|---|
| CN | 101221101 A | 7/2008 |
| CN | 101896274 A | 11/2010 |
| CN | 103018081 A | 4/2013 |
| EP | 0355637 A2 | 2/1990 |
| EP | 0517835 A1 | 12/1992 |
| EP | 1058826 A1 | 12/2000 |
| EP | 1671117 A2 | 6/2006 |
| EP | 1697750 A1 | 9/2006 |
| EP | 1771730 A1 | 4/2007 |
| EP | 1888739 A2 | 2/2008 |
| EP | 2275810 A1 | 1/2011 |
| EP | 2486981 A1 | 8/2012 |
| JP | 8-261896 A | 10/1996 |
| JP | 2003-522521 A | 7/2003 |
| JP | 2005-500522 A | 1/2005 |
| JP | 2006-220654 A | 8/2006 |
| JP | 2007-511740 A | 5/2007 |
| JP | 2012-242386 A | 12/2012 |
| WO | 91/13335 A1 | 9/1991 |
| WO | 99/44031 A1 | 9/1999 |
| WO | 01/68259 A1 | 9/2001 |
| WO | 2005/024385 A2 | 3/2005 |
| WO | 2005/054860 A1 | 6/2005 |
| WO | 2006/012498 A1 | 2/2006 |
| WO | 2006/127852 A2 | 11/2006 |
| WO | 2009/074154 A2 | 6/2009 |
| WO | 2009/086048 A1 | 7/2009 |
| WO | 2010/077975 A1 | 7/2010 |
| WO | 2011/002779 A2 | 1/2011 |
| WO | 2012/048154 A1 | 4/2012 |
| WO | 2012/154905 A1 | 11/2012 |
| WO | 2013106458 A2 | 7/2013 |

OTHER PUBLICATIONS

Chinese communication, with English translation, dated May 25, 2016 in corresponding Chinese patent application No. 201510105679.5.
Japanese communication, with English translation, dated Aug. 23, 2016 in corresponding Japanese patent application No. 2015-047269.
Leica Bond-Max, Leica Biosystems, Dec. 2012, 12 pages.
IQ Kinetic Slide Stainers, IQ1000, IQ2000 & IQ3000, BioCare Medical, 2 pages.
BenchMark Ultra Instrument with Ultimate Reagent Access, Ventana Medical Systems, Inc., 2013, 2 pages.
Wave RPD System, Totally Automated Rapid IHC, Celerus Diagnostics, 5 pages.
Autostainer Plus Immunohistochemistry Staining System, Dako, Jul. 10, 2008, 8 pages.
Thermo Scientific Shandon Sequenza Immunostaining Center, 2 pages.
2012/2013 Immunohistochemistry Solutions, Thermo Scientific, 292 pages.
European communication dated Aug. 7, 2015 in corresponding European patent application No. 15158134.5.
Japanese communication, with English translation, dated Feb. 2, 2016 in corresponding Japanese patent application No. 2015-047269.
Japanese communication, with English translation, dated Dec. 25, 2018 in corresponding Japanese patent application No. 2017-232934.

* cited by examiner

IHC, TISSUE SLIDE FLUID EXCHANGE DISPOSABLE AND SYSTEM

This application claims priority of U.S. Provisional Application Ser. No: 61/951,135 filed Mar. 11, 2014 and 62/039,082 filed Aug. 19, 2014, the disclosures of which are incorporated herein by reference.

BACKGROUND

Immunohistochemistry (IHC) refers to the process of detecting antigens (e.g., proteins) in cells of a tissue section by exploiting specific antibody-antigen interactions using labeled antibodies or other ligands. IHC is also widely used in basic research to understand the distribution and localization of biomarkers and differentially expressed proteins in different parts of a biological tissue. Applications include diagnostics, pharmaceutical development and research.

For example, samples can be prepared on individual slides, or multiple samples can be arranged on a single slide for comparative analysis, such as with tissue microarrays. IHC slides can be processed and stained, and then viewed by either light or fluorescence microscopy. The main output of the tissue staining is for optical or fluorescence imaging as well as archival and storage of stained tissue.

Currently there are high and moderate volume automated systems available for IHC. Manual systems are available for the occasional research, which are labor intensive and require many pipetting and dip/soak washing steps. These steps include slide mounted tissue washing, blocking, primary, secondary and tertiary antibody introduction, covered incubation, as well multiple washes and rinses in between each step. This complex, lengthy handling process is prone to errors, which can ultimately compromise the result.

It would be desirable to provide a system that eliminates drawbacks of the conventional systems, allowing, for example, consistent fluid delivery to the sample, recovery of precious reagents, minimum slide handling (no transfer of slides between different baths) and carrying out of multiple concurrent assays.

SUMMARY

Drawbacks of the prior art have been overcome by the embodiments disclosed herein, which in certain aspects relate to a vacuum source connected to a flow cell sandwiched onto a sample mounted slide. The cell keeps the tissue from drying out, and allows fluids (e.g., blocking agents, antibodies, wash and rinses, etc.) to be introduced and placed into contact with the sample as well as flushed out of the chamber. In certain embodiments, the apparatus includes a slide holder assembly fixture, a slide holder, a slide holder frame, and a slide holder frame assembly adapted to be placed in communication with a driving force such as vacuum to draw fluid through the slide holder.

In certain embodiments, the slide holder includes an injection/recovery port that allows consistent fluid (e.g., antibody, linker, reporter and chromogen) delivery and recovery, while minimizing the introduction of air bubbles, thus reducing error and allowing about >75% fluid (e.g., antibody) recovery, and in certain embodiments, >95% recovery. In certain embodiments, the slide holder includes a reservoir that allows for filling, soaking, rinsing, flushing, uniform antibody coverage of the tissue and reduces handling time, space, and errors. In certain embodiments, the slide orientation in the slide holder allows for visualization of label information and tissue to confirm adequate antibody coverage. The multi-port frame allows multiple assays to be carried out concurrently (e.g., 1-12 slides can be processed per frame assembly). The slide holder frame is removable from a vacuum manifold and allows for easy transport from the vacuum manifold to an incubator/refrigerator and back.

BRIEF DESCRIPTION OF THE DRAWINGS

FIG. 17A is an exploded perspective view of a slide and slide holder flow cell assembly in accordance with certain embodiments;

FIG. 17B is a perspective view of the slide mounted to a slide holder flow assembly in accordance with certain embodiments;

DETAILED DESCRIPTION

Figure 1:
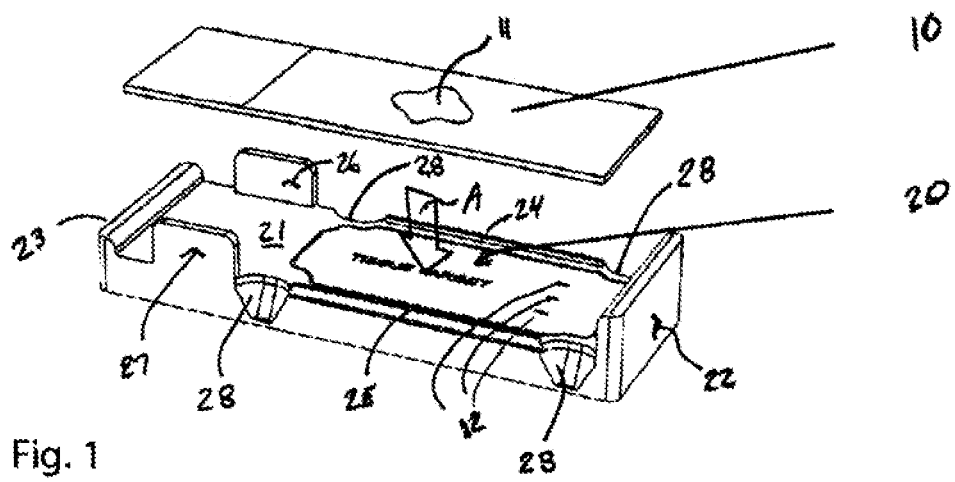
FIG. 1 is an exploded view, in perspective, of a slide holder assembly fixture and slide in accordance with certain embodiments.

Turning first to FIG. 1, there is shown a slide 10 having a sample 11 thereon, such as a tissue sample. Typically the tissue sample has already gone through a fixative process before it is placed on the slide 10. The slide 10 is a conventional sample holder and can be planar and made of glass, for example. Also shown is sample or slide holder assembly fixture 20, which receives slide 10 in mounting engagement. In certain embodiments, the sample 11 is oriented on the topside of the slide 10, and when placed into position, resides within a predetermined sample target region (arrow A) of the slide holder assembly fixture 20. In certain embodiments, one or more level indicators 12 (three shown) are positioned in the sample target region, which assist the operator in positioning of sample in a manner that ensures sample coverage even in a half-filled sample chamber, thus using a minimal amount of primary antibody.

Figure 2:
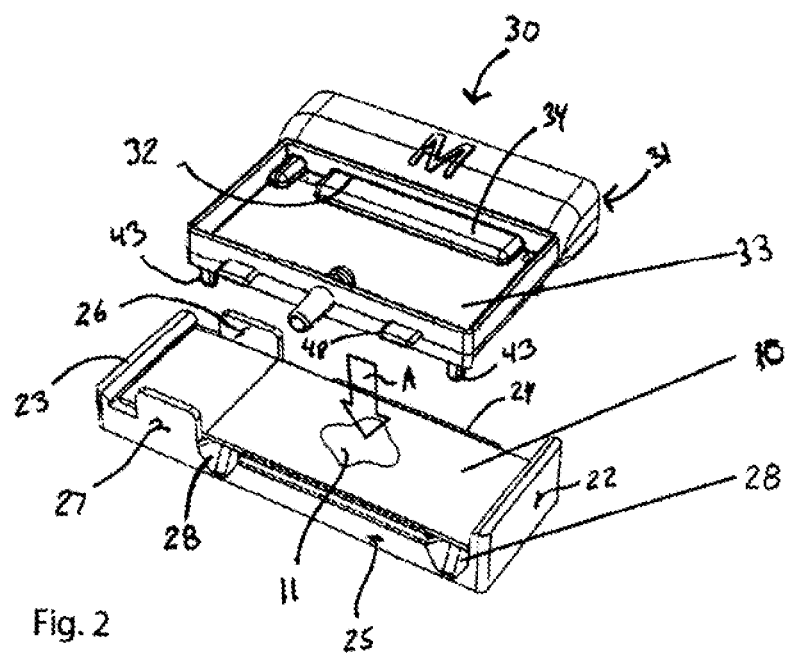
FIG. 2 is an exploded view, in perspective, of a slide holder assembly fixture with a mounted slide, and a slide holder, in accordance with certain embodiments.

In certain embodiments, the slide holder assembly fixture 20 is an elongated member having a generally flat top surface 21, an end wall 22, and an opposite end wall 23. In certain embodiments, the end wall 22 extends vertically above the surface 21 a higher distance than the end wall 23. The length between the inwardly facing surfaces of the end walls 22 and 23 is slightly longer than the length of slide 10, so that slide 10 fits between the end walls 22, 23 as shown in FIG. 2. Short side walls 24, 25, as well as alignment fins 26, 27, are arranged on the perimeter of the surface 21 and extend vertically upwardly from the surface 21, and also serve to contain the slide in position on the surface 21 of the slide holder assembly fixture 20. Alignment fins 26, 27 also serve as alignment members for positioning the slide holder 30, as discussed in greater detail below. In certain embodiments, spaced cut outs 28 (four shown) are formed in the surface 21 of the fixture 20. In certain embodiments, each cut out 28 is shaped as a partial truncated cone, with its inwardly deepest cut portion positioned at the surface 21, tapering outwardly towards the side perimeter as the cut approaches the bottom of the fixture 20. The cut outs 28 are configured to receive respective compression clips 43 of slide holder 30, as discussed in greater detail below.

Figures 5A, 5B:
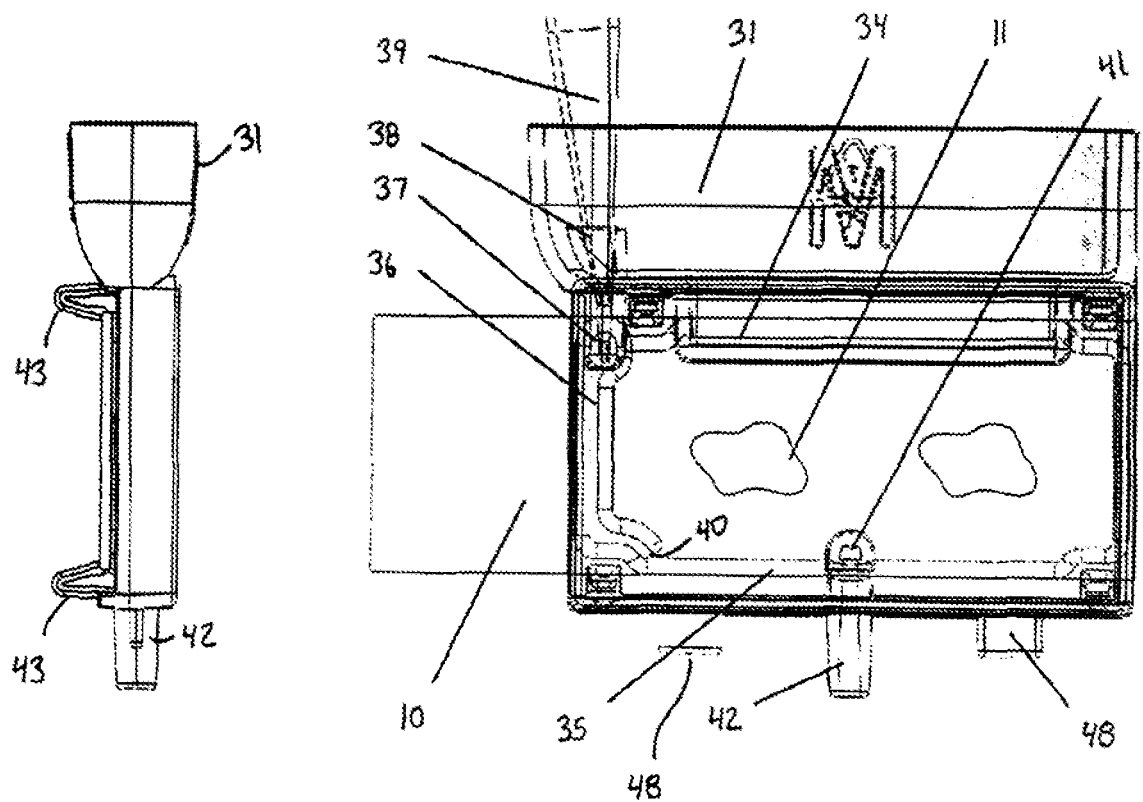
FIG. 5A is a front view of a slide holder in accordance with certain embodiments.
FIG. 5B is a side view of the slide holder of FIG. 5A in accordance with certain embodiments.
Figure 5C:
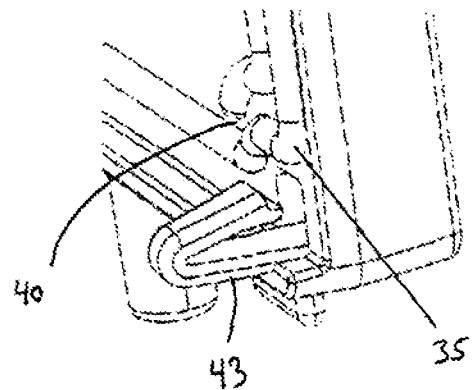
FIG. 5C is an enlarged perspective view of a portion of the gasket in the slide holder in accordance with certain embodiments.

In certain embodiments, slide holder 30 is a single use device and includes a reservoir 31 and a sample chamber 33 in fluid communication with the reservoir 31 via narrow slit 32 at the bottom of the reservoir 31 that communicates with a reservoir channel 34 opening into the sample chamber 33. In certain embodiments, the reservoir 31 is configured to hold up to 20 ml of fluid volume. In certain embodiments, the slide holder 30 may be made of polycarbonate, polystyrene, polyethylene or derivatives (e.g., PETG, PET, PE, PETE), polypropylene or acrylic. In certain embodiments, the sample chamber 33 includes a gasket 35, such as a dispensed silicon gasket, as seen in FIG. 5A. In certain embodiments, the gasket 35 also could be overmolded, such as overmolded thermoplastic elastomer (TPE), overmolded silicone, diecut silicone, diecut double stick foam, thick diecut acrylic adhesive, etc. The gasket 35 includes a region that delimits an injection/recovery port fluid channel 36. The injection/recovery port fluid channel 36 is in fluid communication with an injection/recovery port channel port 37, that in turn is in fluid communication with injection/recovery port 38 configured to receive an injecting device such as a pipette 39. The injection/recovery port fluid channel 36 opens into sample chamber 33 at outlet opening 40, best seen in FIG. 5C.

Figure 4:
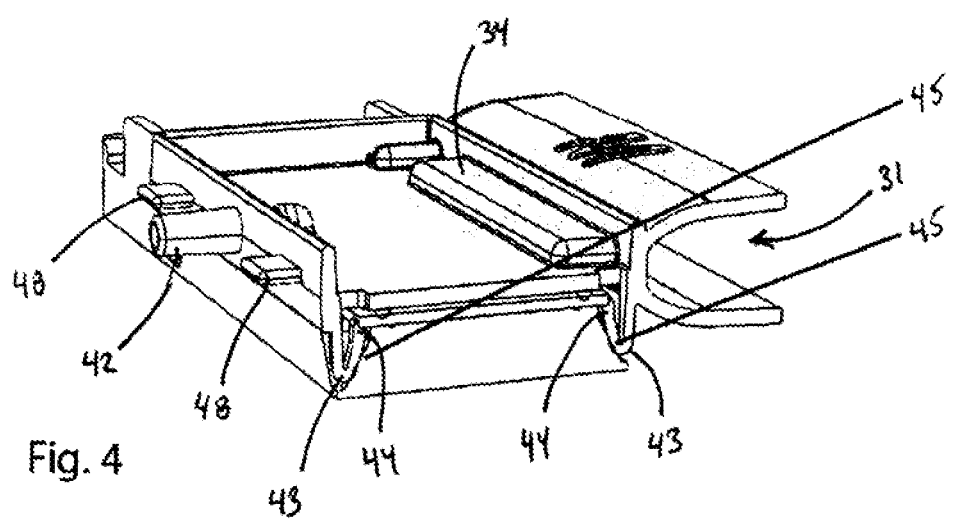
FIG. 4 is a perspective view side view of a slide holder mounted on a slide holder assembly fixture, in accordance with certain embodiments.

In certain embodiments, slide holder 30 includes a drain port 41 that drains fluid from the chamber 33 to drain 42. In certain embodiments, slide holder 30 includes spaced slide compression clips 43, each of which is received by and engaged in a respective cut out 28 of the slide holder assembly fixture 20. In certain embodiments, the compression clips 43 terminate in a free end 44 and include ramp notches 45 (FIG. 4) that provide flexibility to the compression clips 43.

Figure 3:
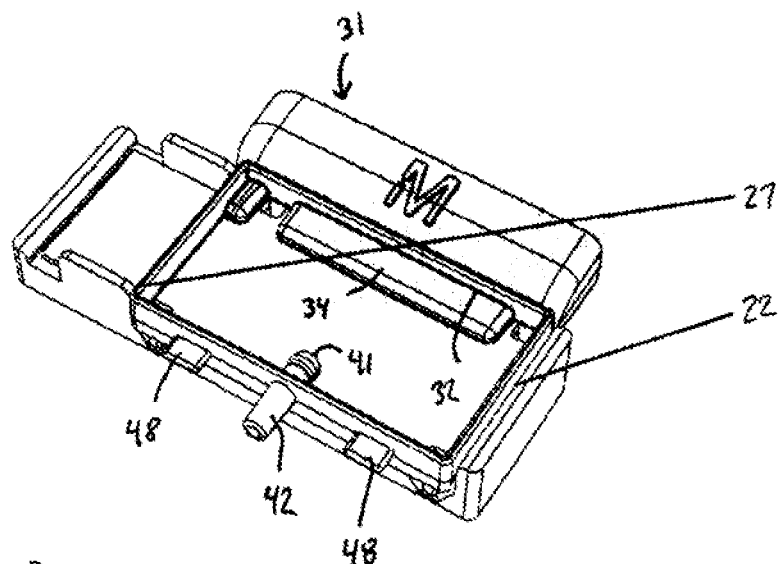
FIG. 3 is a perspective top view of a slide holder mounted on a slide holder assembly fixture, in accordance with certain embodiments.
Figure 6:
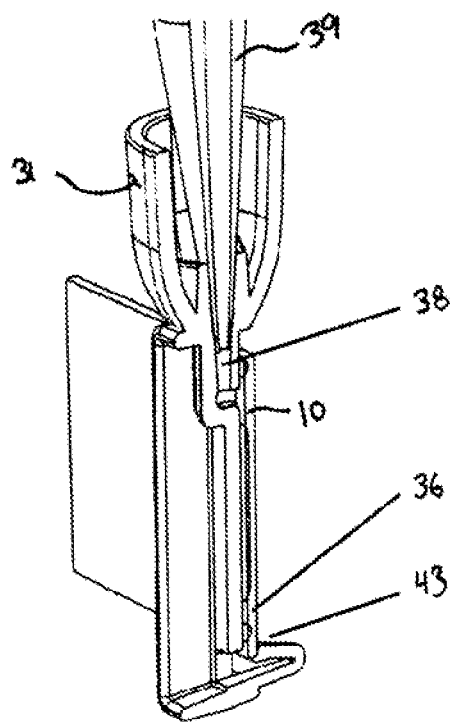
FIG. 6 is a first perspective view of a portion of the slide holder of FIG. 5A in accordance with certain embodiments.
Figure 7:
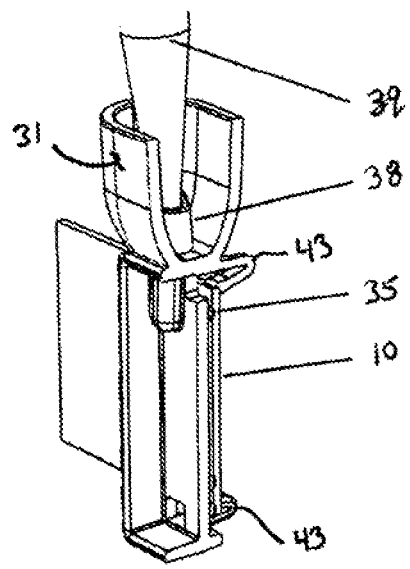
FIG. 7 is a second perspective view of a portion of the slide holder of FIG. 5A in accordance with certain embodiments.

In certain embodiments, to attach the slide 10 to the slide holder 30, the slide holder 30 is positioned above the slide as shown in FIG. 2, and is pressed down onto the slide holder assembly fixture 20, aligning with the alignment fins 26, 27, the side walls 24, 25 and the end wall 22 (FIG. 3). The ramp notches 45 that deflect the slide compression clips 43 allow for optimum engagement in the cut outs 28. In this assembled state, the sample 11 supported on the slide 10 is positioned in the sample chamber 33 of the slide holder 30. Suitable fluids can be introduced into the sample chamber 33, such as via pipette 39 or by the reservoir 31. For example, the tip of pipette 39 can be inserted into the injection/recovery port 38 as best seen in FIGS. 6 and 7. Fluid from the pipette 39 flows into the injection/recovery port fluid channel 36, outlet opening 40 and into sample chamber 33 where it contacts the sample.

Figure 8:
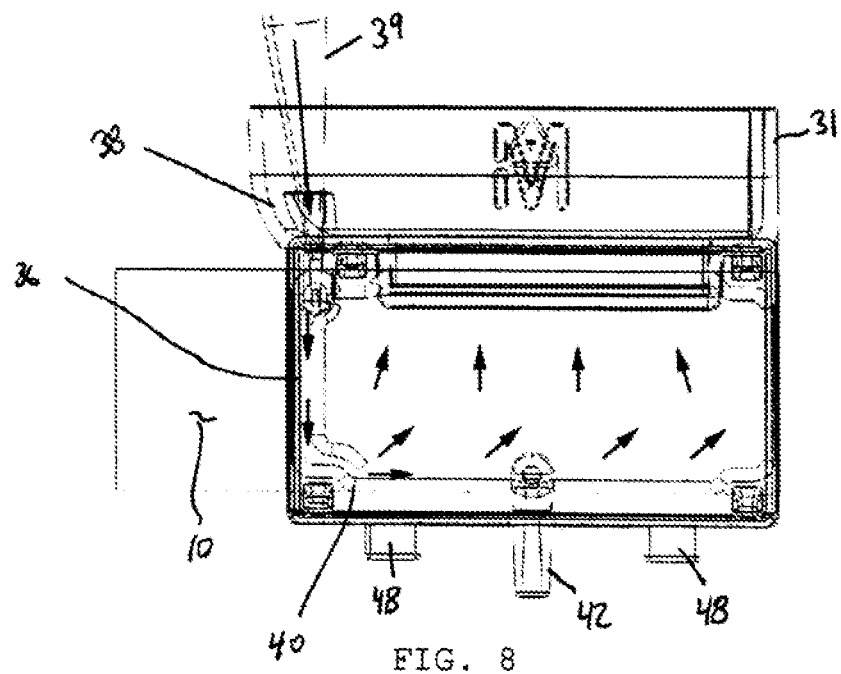
FIG. 8 is a front view of the slide holder of FIG. 5 showing the direction of fluid flow into the slide holder chamber in accordance with certain embodiments.

Turning now to FIG. 8, the arrows depict the flow of fluid, such as antibodies, linkers, reporters, and chromogens which can be introduced into the injection/recovery port 38 via pipette 39, for example. The fluid travels down the injection/recovery port fluid channel 36, out outlet opening 40, and into the sample chamber 33 where it fills the chamber from the bottom up, thus reducing potential bubbles that could cause inconsistent coverage of the sample supported on the slide 10.

Figure 9:
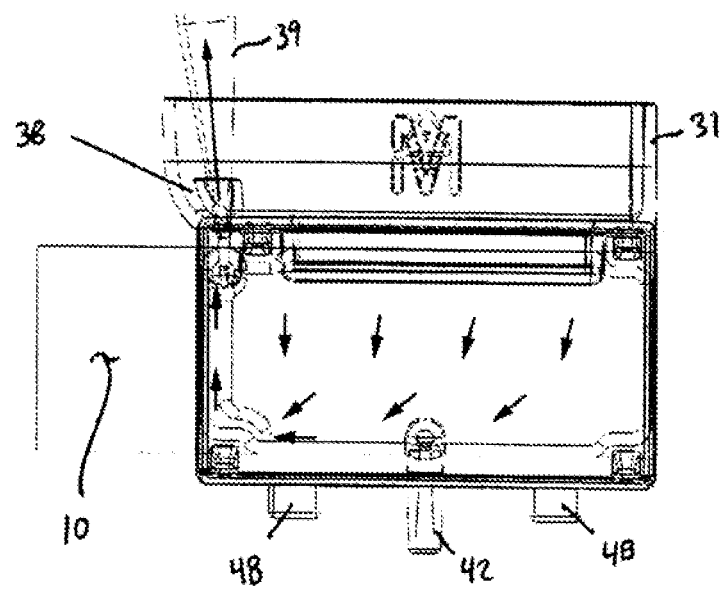
FIG. 9 is a front view of the slide holder of FIG. 5 showing the direction of fluid flow out of the slide holder chamber in accordance with certain embodiments.

FIG. 9 depicts the flow of fluid during removal or recovery of the fluid from the sample chamber. Here, the injection/recovery port 38 is used as a retrieval port by using the pipette 39 to suck out fluid from the sample chamber to recover >75% of the fluid. In certain embodiments, as much as 95% recovery is achieved. High recovery can be important, particularly where the fluid comprises precious or custom antibodies.

Figure 10:
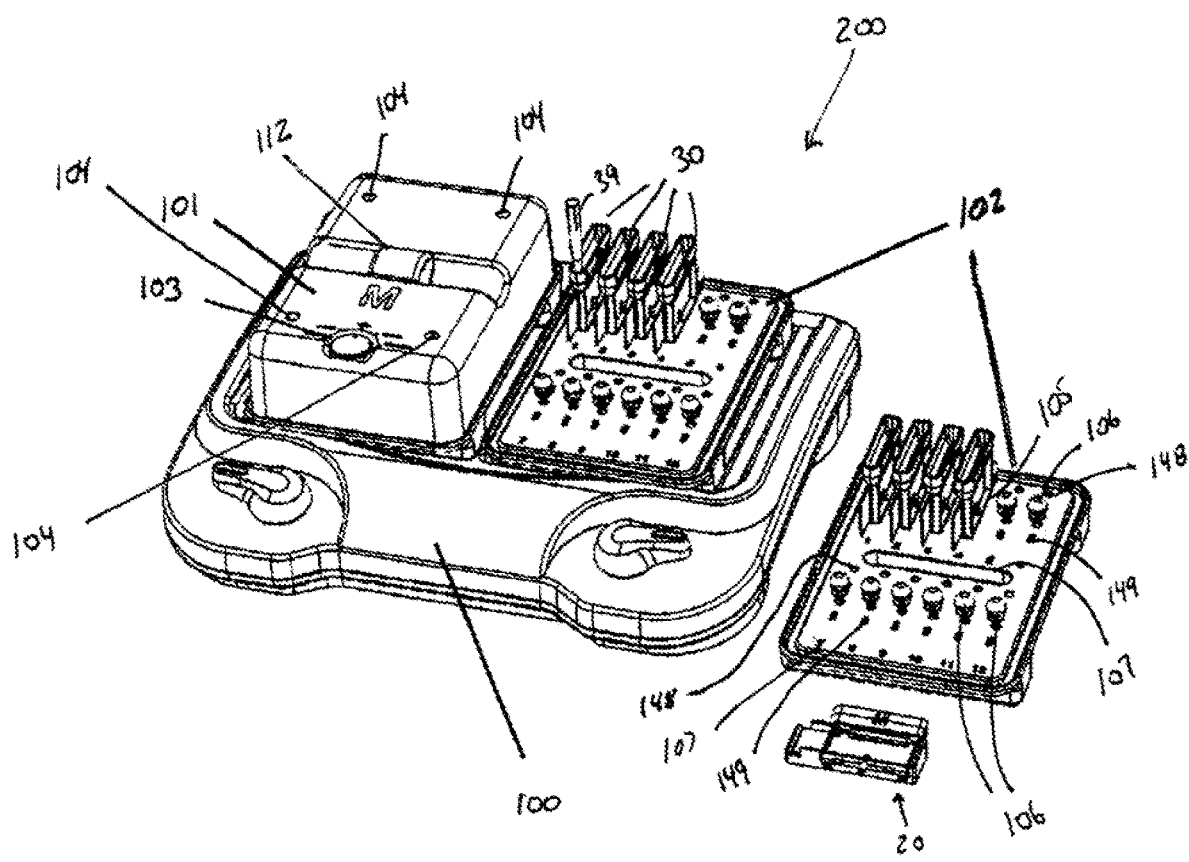
FIG. 10 is a perspective view of a slide holder frame and cover holding slide holders in accordance with certain embodiments.
Figure 11:
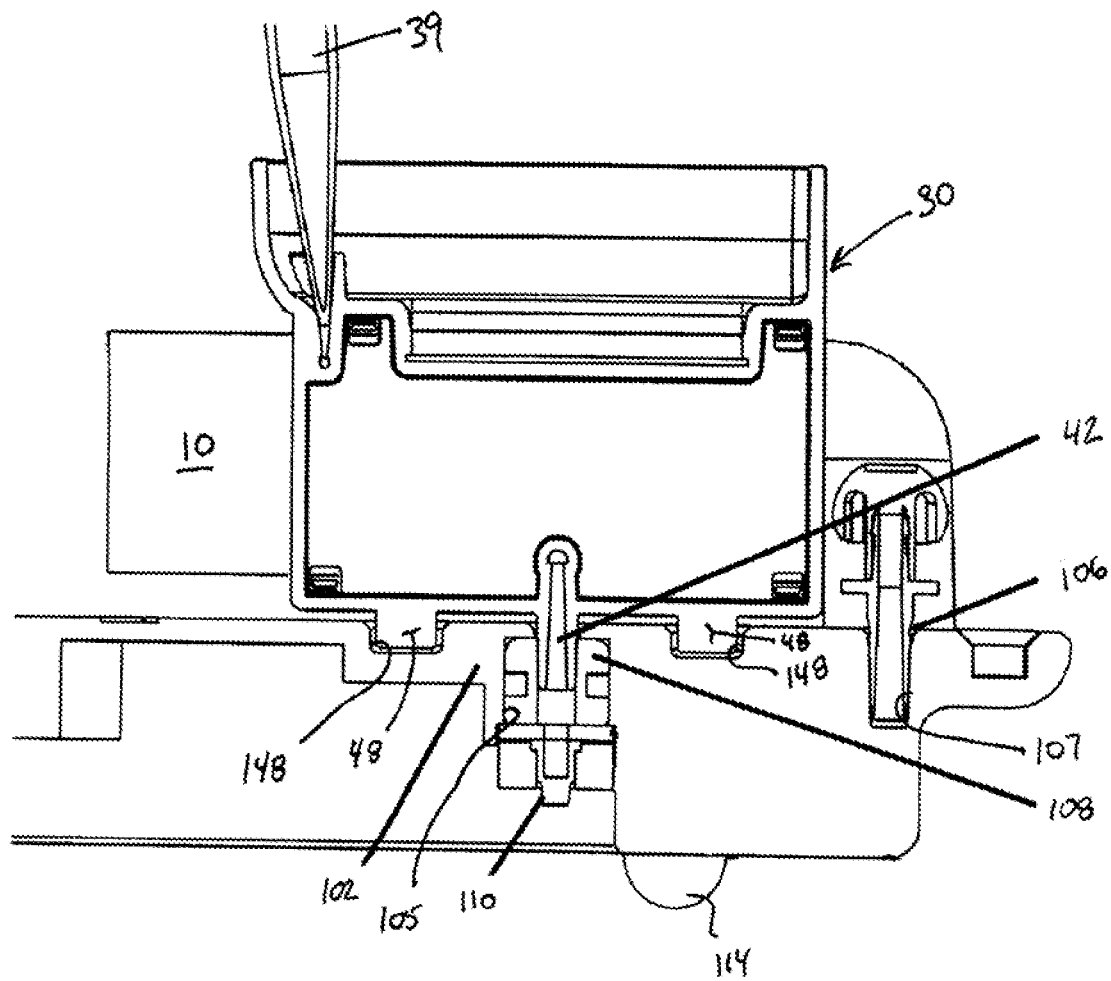
FIG. 11 is a cross-sectional view of a slide holder positioned in a slide holder frame in accordance with certain embodiments.

Turning now to FIGS. 10 and 11, as assembly 200 is shown, which includes manifold base 100, sample or slide holder frame 102, and cover 101. In certain embodiments, the manifold base 100 is in communication with a driving force (not shown), such as a vacuum, to drive fluid through one or more slide holders 30 mounted on a slide holder frame 102 positioned on the manifold base 100, which can serve as a wash basin for multiple rinses, washes, etc. of the sample. In certain embodiments, one or more covers 101 can be positioned over the one or more slide holders 30 to prevent light from affecting any fluorescent signal chemistries involved in the assay and eliminating potential contamination of samples. In certain embodiments, the manifold base 100 can accommodate one or more slide holder frames 102. Each slide holder frame (102) can hold, for example, 1-12 slide holders 30 in communication with the driving force. The slide holder frame 102 can be removable from the manifold base 100.

In certain embodiments, cover 101 can include a pinch handle 112 to assist in lifting cover 101 off the slide holder frame 102. In certain embodiments, the cover 101 can include a task tracker 103 to track which step in the protocol is in process, which is useful when multiple slide holder frames 102 are being used simultaneously, or are residing in an incubation chamber or refrigerator. In certain embodiments, the task tracker 103 is a movable dial (with respect to the cover surface) with one or more stationary markings that point to other markings on the cover 101. In certain embodiments, the cover 101 may also have a plurality of spaced stacking indents 104 each configured to receive a respective leg 114 (FIG. 11) of another slide holder frame 102 to enable stacking for economy of space such as may be necessary when placed in an incubation chamber.

Figure 12:
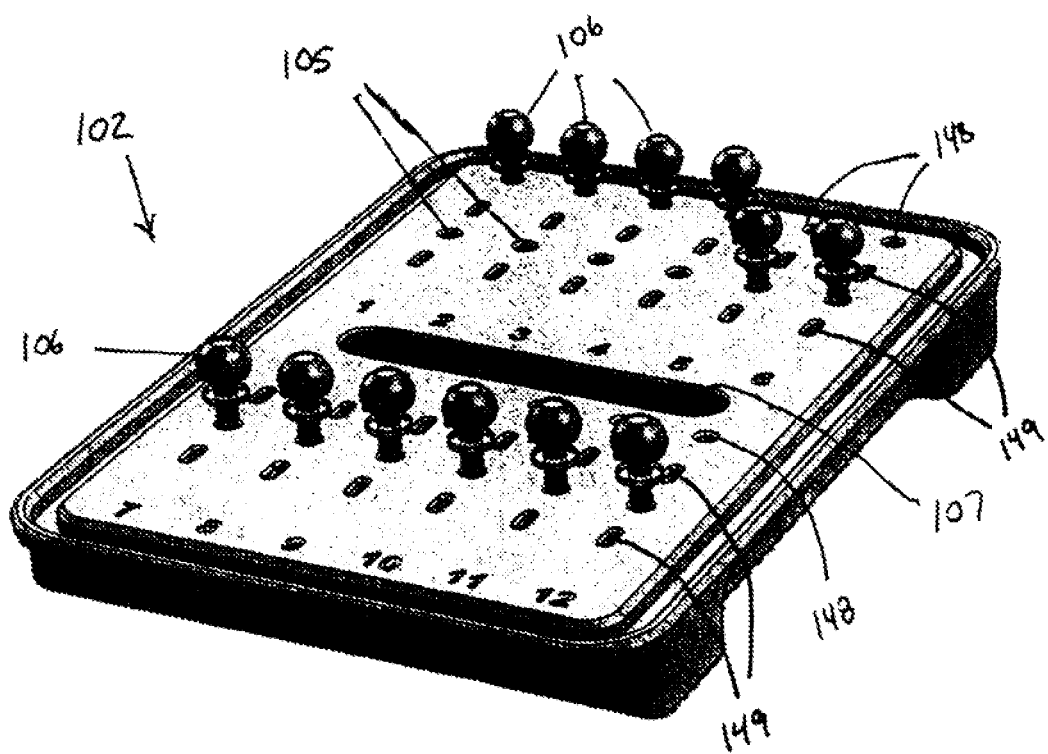
FIG. 12 is a perspective view of a slide holder frame in accordance with certain embodiments.

In certain embodiments, the slide holder frame 102 includes a plurality of ports 105 (FIG. 12), each configured to receive a respective slide holder 30. The ports can be numbered as shown for facilitating the tracking of each individual assay. In the embodiment shown, each slide holder frame 102 is configured to hold up to 12 slide holders 30 along with 12 port plugs 106, although those skilled in the art will appreciate that fewer or more could be used. If a port 105 is not occupied by a slide holder 30, a port plug 106 can be installed to retain vacuum in the system. When ports 105 are in use (e.g., are occupied by a slide holder 30), the plug 106 for that port 105 can be stored in a convenient storage aperture 148 next to the installed slide holder 30. In certain embodiments, the slide holder frame 102 can include a well 107 for storage of the slide holder assembly fixture 20. Activation of the driving force such as vacuum allows for simultaneous fluid flushing of multiple slide holders 30 positioned in the slide holder frame 102.

FIG. 11 illustrates certain embodiments of the slide holder 30 positioned in the slide holder frame 102. In accordance with certain embodiments, spaced tabs 48 on the bottom of the slide holder 30 are received by corresponding slots 149 in the slide holder frame 102. When slide holder 30 is so positioned in the slide holder frame 102, the drain 42 penetrates into port 105 and is sealed by port seal 108. A valve 110, such as a duckbill valve, is positioned in the port 105 and prevents fluid from exiting the slide holder chamber 33 until the valve is overcome by the application of vacuum to the port 105.

In certain embodiments, blocking, rinsing and washing steps are achieved by loading up the reservoir 31 such as with a repeating pipette, squirt bottle or any dispensing device. A solution is loaded and flows into the sample chamber 33 and is allowed to soak the sample. The vacuum is activated and the solution flows over the sample and out the drain 42, rinsing off any residual blocker, antibodies, linkers, reporters, chromogens or hemotoxilins, for example.

In certain embodiments, slide 10 supporting tissue sample 11 is placed in the slide holder assembly fixture 20 with the tissue side facing upwardly. The slide 10 is placed to ensure that the region containing the tissue is within the target area so as to not interfere with the gasket seal of the slide holder 30, as aided by indicators 12. The slide holder 30 is then aligned onto the slide holder assembly fixture 20 and pressed firmly onto the slide 10 until the compression clips 43 engage in the respective cut-outs 28.

This assembly is next plugged into a desired port inserted into the slide holder frame 102 on the base 100. The sample port position can be recorded if needed. Any unused ports in the frame 102 are plugged with a port plug 106 as necessary. In certain embodiments, the plane of the slide is thus perpendicular to the plane of the surface of the slide holder frame 102; it is positioned in a horizontal/vertical plane to allow view of sample and slide information, and minimize fluid chamber volume.

If hydration or washing is necessary, the desired solution is introduced into the reservoir 31 such as to hydrate or wash the tissue sample, for a desired time period. Vacuum can then be applied to the base to wash and flush the solution from the slide holder.

Blocking can be carried out by loading the desired concentration of a blocking agent into the injection/recovery port 38 or the reservoir 31 of the sample chamber 33. Enough blocking solutions should be loaded to cover the sample 11 in the sample chamber 33.

Once all of the slide holders are filled, and if incubation is needed, the slide holder frame is covered with cover 101, and the task tracker 103 can be set to the appropriate task, such as the "blocker" indication. The covered frame 102 may then be incubated, such as at room temperature, in an incubator, or in a refrigerator for the desired time.

After incubation, the blocking agent can be flushed by returning the frame 102 to the base 100, removing the cover, and applying vacuum, and any necessary wash steps carried out by introducing wash solution to the reservoir 31, allowing the sample 11 to soak (if needed) in the wash solution for the desired time, and then flushing by applying vacuum. A plurality of such wash steps can be employed if desired.

Primary antibody of the desired concentration can be introduced into the injection/recovery port 38 in an amount sufficient to cover the sample 11. If an incubation step is desired, the frame 102 is covered with cover 101, and the task tracker set to the appropriate indication, such as "primary". The covered frame 102 may then be incubated, such as at room temperature, in an incubator, or in a refrigerator, for the desired time.

After incubation, the frame 102 is placed back on the base 100, the cover removed, and flushed using vacuum. Alternatively, primary antibody can be recovered by extracting it from sample chamber 33 via port 38, such as with a pipette.

Any desired wash steps carried out by introducing wash solution to the reservoir 31, allowing the sample 11 to soak (if needed) in the wash solution for the desired time, and then flushing by applying vacuum. A plurality of such wash steps can be employed if desired.

Linker or secondary antibody of the desired concentration can be introduced into the injection/recovery port 38 in an amount sufficient to cover the sample 11. If an incubation step is desired, the frame 102 is covered with cover 101, and the task tracker set to the appropriate indication, such as "linker". The covered frame 102 may then be incubated, such as at room temperature, in an incubator, or in a refrigerator for the desired time.

After incubation, the frame 102 is placed back on the base 100. Any desired wash steps may be carried out by removing the cover, introducing wash solution to the reservoir 31, allowing the sample 11 to soak (if needed) in the wash solution for the desired time, and then flushing by applying vacuum. A plurality of such wash steps can be employed if desired.

Reporter or tertiary antibody of the desired concentration can be introduced into the injection/recovery port 38 in an amount sufficient to cover the sample 11. If an incubation step is desired, the frame 102 is covered with cover 101, and the task tracker set to the appropriate indication, such as "reporter". The covered frame 102 may then be incubated, such as at room temperature, in an incubator, or in a refrigerator for the desired time.

After incubation, the frame 102 is placed back on the base 100. Any desired wash steps may be carried out by removing the cover, introducing wash solution to the reservoir 31, allowing the sample 11 to soak (if needed) in the wash solution for the desired time, and then flushing by applying vacuum. A plurality of such wash steps can be employed if desired.

Chromogen can be introduced into the injection/recovery port 38 in an amount sufficient to cover the sample 11. If an incubation step is desired, the frame 102 is covered with cover 101, and the task tracker set to the appropriate indication, such as "chromogen". The covered frame 102 may then be incubated, such as at room temperature, in an incubator, or in a refrigerator for the desired time.

After incubation, the frame 102 is placed back on the base 100. Any desired wash steps can be carried out by removing the cover, introducing wash solution to the reservoir 31, allowing the sample 11 to soak (if needed) in the wash solution for the desired time, and then flushing by applying vacuum. A plurality of such wash steps can be employed if desired.

Figure 13:
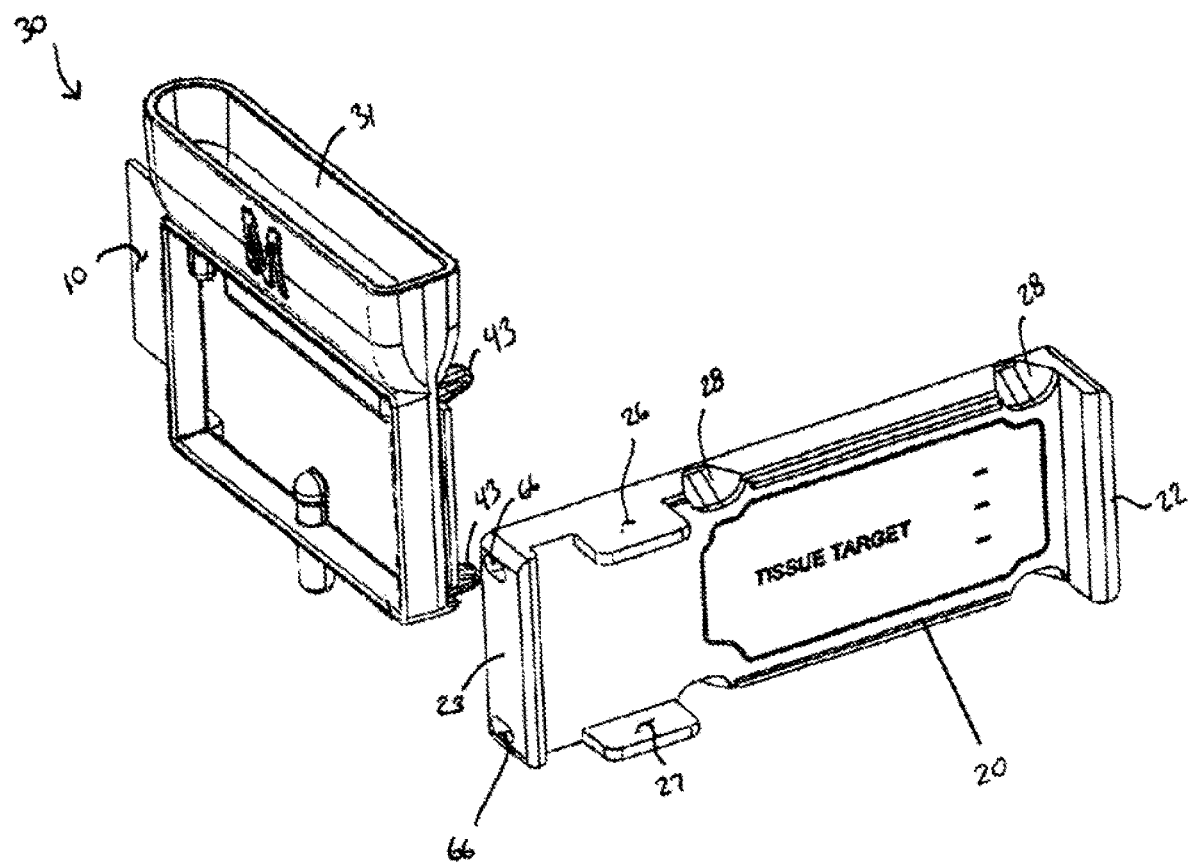
FIG. 13 is a perspective view of a slide holder and slide holder assembly fixture showing a slide release feature in accordance with certain embodiments.

Upon completion of the chromogen step, a final wash can be carried out before the slide holders are removed from the slide holder frame 102. Removal of the slide 10 from the slide holder 30 can be carried out by bending away the bottom two compression clips 43 such as by inserting them into slots 66 in the slide holder assembly fixture 20 (FIG. 13), thereby releasing the slide 10. The slide holder 30 can be discarded.

Figure 14:
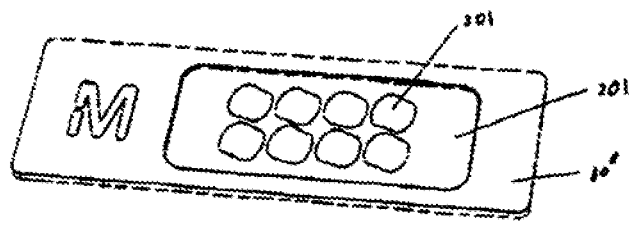
FIG. 14 is a perspective view of a slide having a membrane attached thereto in accordance with certain embodiments.

FIG. 14 illustrates another embodiment of a slide 10'. In the embodiment shown, the slide 10' can be a molded or a diecut slide with a porous membrane 201 attached to it. The membrane can be attached to the slide by any suitable means, such as by heat sealing, ultrasonic welding, or with a suitable adhesive, such as silicone-based adhesive or an acrylic adhesive. A wide variety of membranes made from a wide variety of materials may be used in the embodiments described herein. Examples of such materials include polysaccharides, synthetic and semi-synthetic polymers, metals, metal oxides, ceramics, glass, and combinations thereof. Exemplary polymers that can be used to manufacture the membranes that may be used include, but are not limited to, substituted or unsubstituted polyacrylamides, polystyrenes, polymethacrylamides, polyimides, polyacrylates, polycarbonates, polymethacrylates, polyvinyl hydrophilic polymers, polystyrenes, polysulfones, polyethersulfones, copolymers or styrene and divinylbenzene, aromatic polysulfones, polytetrafluoroethylenes (PTFE), perfluorinated thermoplastic polymers, polyolefins, aromatic polyamides, aliphatic polyamides, ultrahigh molecular weight polyethylenes, polyvinylidene difluoride (PVDF), polyetheretherketones (PEEK), polyesters, and combinations thereof. Exemplary commercially available membranes are Durapore® and Millipore Express® and Millipore Express PLUS® available from EMD Millipore Corp. (Billerica, Mass.). Preferably the membranes are microporous membranes.

Sample sections 301 such as tissue sections are mounted to the membrane 201. The membrane 201 acts as a sample support, allowing blocking and antibody fluids, for example, to interact with the sample, but also allows for fluid transfer through the membrane 201 during rinsing and washing steps, for example.

Figure 15A:
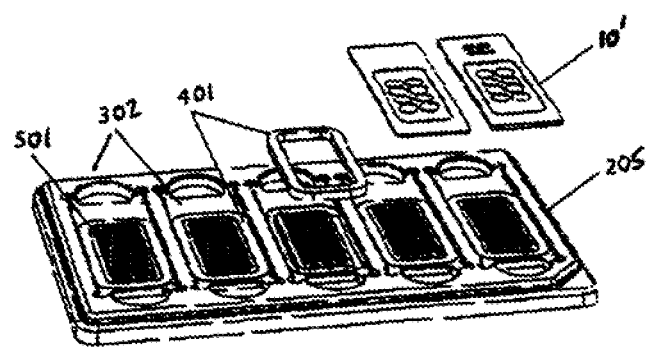
FIG. 15A is an exploded perspective view of the slide of FIG. 14 and a vacuum manifold having slide wells, in accordance with certain embodiments.
Figure 15B:
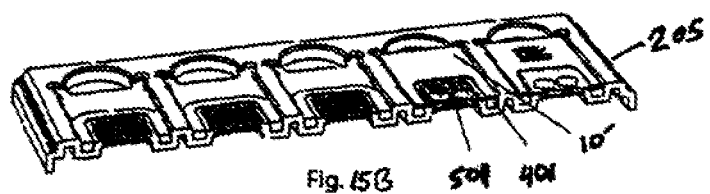
FIG. 15B is a perspective view, in cross-section, of slide wells of a vacuum manifold, in accordance with certain embodiments.
Figure 15C:
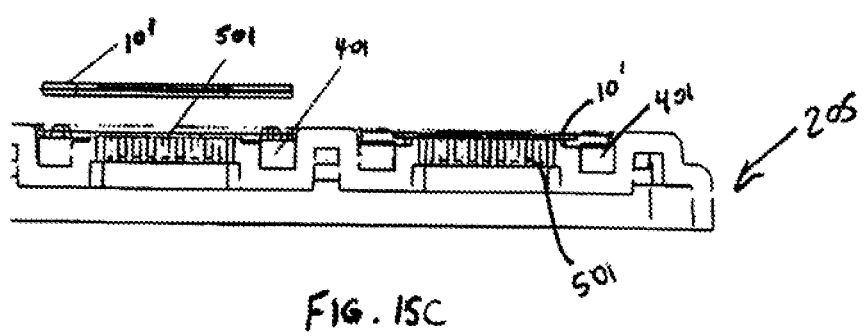
FIG. 15C is an exploded cross-sectional view of a slide and slide wells of a vacuum manifold, in accordance with certain embodiments.

As shown in FIGS. 15A, 15B and 15C, each slide 10' can be positioned directly into a corresponding slide well 302 in a vacuum manifold slide frame 205. The vacuum manifold slide frame 205 may have one or more slide wells 302. In certain embodiments, each slide well 302 has a gasket 401 such as a silicone or foam sealing gasket 401 to seal each slide 10' in a respective slide well 302. Upon application of vacuum as the driving force, fluid transfers through the membrane 301 and through a porous surface underdrain 501 beneath (in the direction of fluid flow) the membrane 201. In certain embodiments, the underdrain includes molded drain slots, holes, sintered porous material, etc. that support the membrane due to membrane sagging. Preferably the underdrain is easy to clean but moldable and provides a vacuum driven draining from below.

Figure 16A:
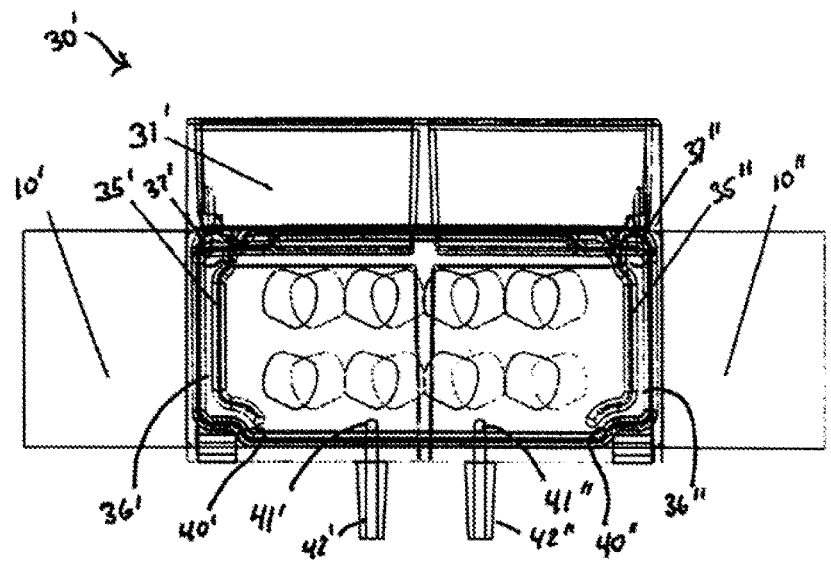
FIG. 16A is a front view of a slide holder in accordance with certain embodiments.
Figures 16B, 16C:
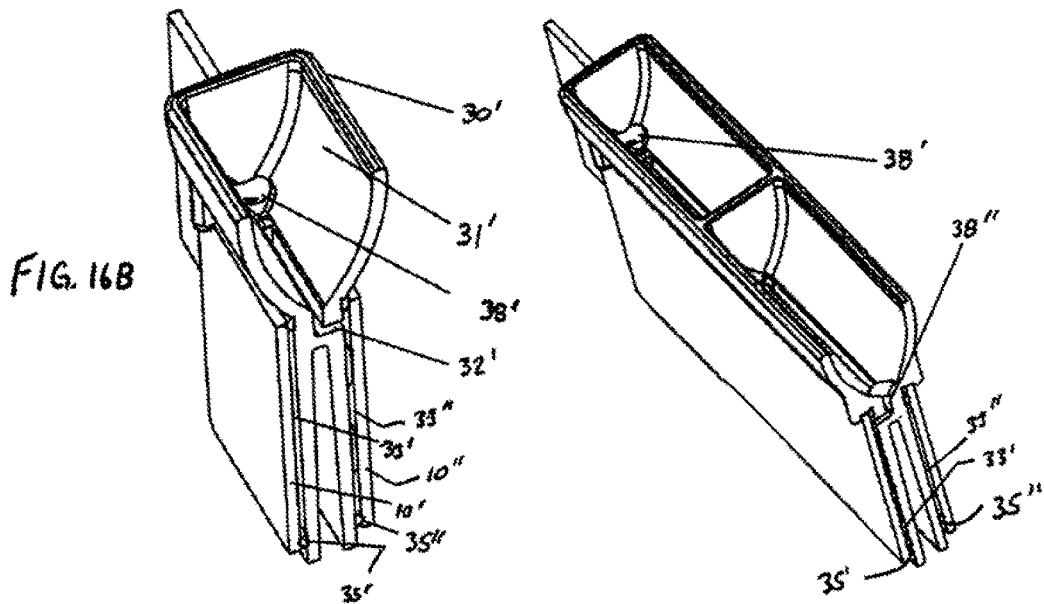
FIG. 16B is a first perspective view, in cross-section, of a slide holder in accordance with certain embodiments.
FIG. 16C is a second perspective view, in cross-section, of a slide holder in accordance with certain embodiments.
Figure 16D:
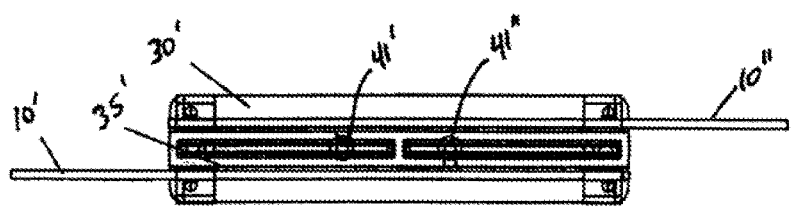
FIG. 16D is top view of a slide holder in accordance with certain embodiments.

FIGS. 16A-16C illustrate an alternative embodiment of a slide holder 30'. Like slide holder 30, slide holder 30' is a single use device and includes a reservoir 31' and drain ports 41', 41" that respectively drain fluid from each chamber into drains 42', 42". Unlike slide holder 30, slide holder 30' includes multiple sample chambers 33' and 33" (two shown), each in fluid communication with the reservoir 31' via narrow slit 32' at the bottom of the reservoir 31'. In certain embodiments, the chambers 33' and 33" are opposed to one another and coextensive, but are in fluid isolation from one another so that each sample in a respective chamber is acted on independently of the other. In certain embodiments, each sample chamber 33', 33" includes a respective gasket 35', 35", such as a dispensed silicon gasket, as seen in FIGS. 16B and 16C. In certain embodiments, the gaskets 35', 35" also could be overmolded, such as overmolded thermoplastic elastomer (TPE), overmolded silicone, diecut silicone, diecut double stick foam, thick diecut acrylic adhesive, etc. Each gasket 35', 35" includes a region that delimits a respective injection/recovery port fluid channel 36', 36". Each injection/recovery port fluid channel 36', 36" is in fluid communication with a respective injection/recovery port channel port 37', 37", which in turn is in fluid communication with a respective injection/recovery port 38', 38" configured to receive an injecting device such as a pipette. Each injection/recovery port fluid channel 36', 36" opens into a respective sample chamber 33', 33" at respective outlet openings 40', 40".

In certain embodiments, the slides 10', 10" are attached to the slide holder 30' in a manner similar to the above embodiment where only one slide and sample chamber is present. Suitable fluids can be introduced into the sample chamber 33', such as via pipette or by the reservoir 31'. For example, the tips of respective pipettes can be inserted into the injection/recovery ports 38', 38". Fluid from each pipette flows into the respective injection/recovery port fluid channel 36', 36", respective outlet openings 40', 40" and into respective sample chambers 33', 33", where it contacts the samples.

Figure 17C:
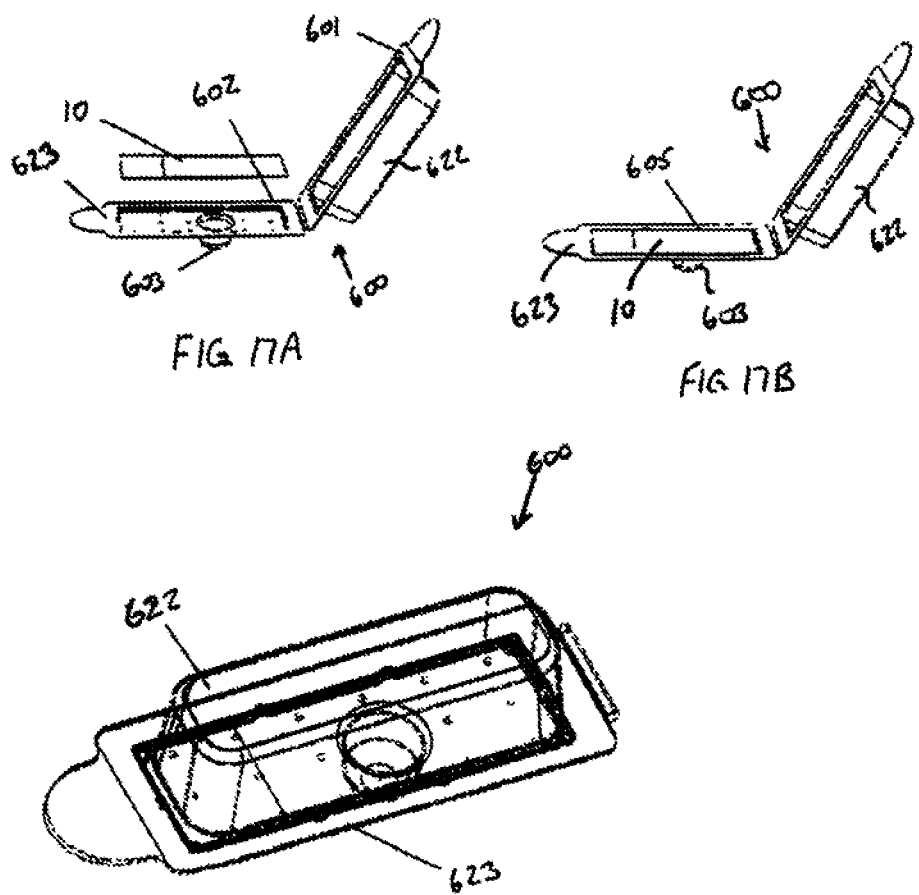
FIG. 17C is a bottom perspective view of the assembly of FIG. 17B.

FIGS. 17A-17C illustrate a horizontal embodiment where a tissue mounted substrate 10 such as a standard glass slide is constrained within a thermoformed slide holder flow cell 600 and sealed with a suitable adhesive 601, such as a semi-permanent fluid-proof adhesive, such as an acrylic or silicone-based adhesive. In certain embodiments, the thermoformed slide holder flow cell 600 has a plurality of standoffs 602 positioned in each of the four corners to allow a slight gap on the sides and underneath the slide 10 to allow for drainage. The flow cell 600 includes an open top member 622 that is hingedly connected to slide holder member 623. In certain embodiments, the hinge is a "living hinge" formed during the thermoforming process. The top member 622 is in the open position shown in FIG. 17A to load the slide into the flow cell 600, and is then pivoted into a closed position as shown in FIG. 17C. Various reagents, such as blocking agents, antibodies and stains can be placed onto the tissue on the slide 10, and rinse and soak solutions can be introduced from the reservoir opening on the top 622 (FIG. 17C).

Figure 18A:
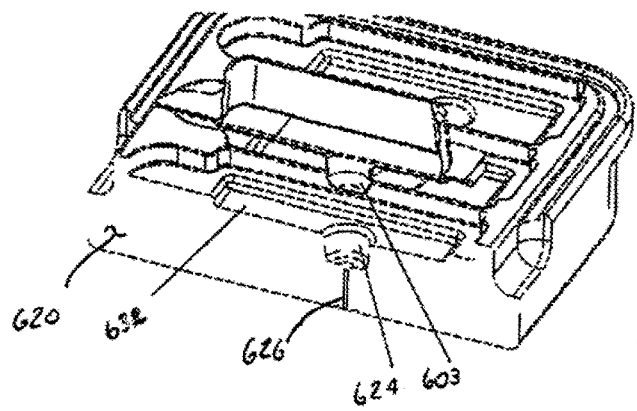
FIG. 18A is an exploded perspective view, in cross-section, of a manifold frame and slide holder flow cell in accordance with certain embodiments.
Figure 18B:
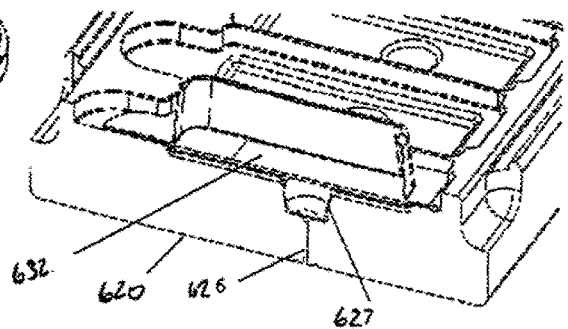
FIG. 18B is a perspective view, in cross-section, of the manifold frame and slide holder flow cell of FIG. 18A with the flow cell in place, in accordance with certain embodiments.
Figure 18C:
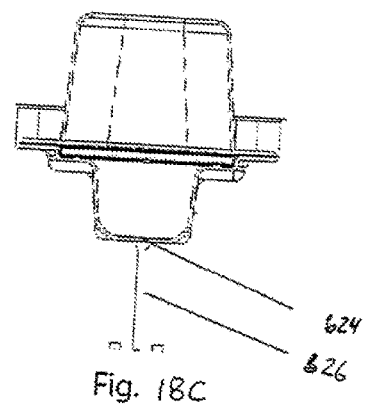
FIG. 18C is a side view, in cross-section, of the assembly of FIG. 18B.

FIGS. 18A-18C illustrate an embodiment of a manifold suitable for use with the thermoformed slide holder flow cell 600 shown in FIG. 17A. In certain embodiments, vacuum manifold frame 620 includes a plurality of slide holder wells 632. Each well 632 is configured to receive a respective slide holder flow cell 600. In certain embodiments, each well 632 includes a drain port 624, which receives the drain 603 of the slide holder flow cell 600 in sealing relation (627). In certain embodiments, a drain channel 626 is formed in the manifold frame 620 in communication with the drain port 624. Upon the introduction of a driving force such as vacuum, fluid is flushed from the slide through the multiple bypasses 605, and down through the drain 603 and then through the drain channel 626. A valve, such as a duckbill valve, may be positioned in the port 624 and prevents fluid from exiting until the valve is overcome by the application of vacuum.

Figure 19:
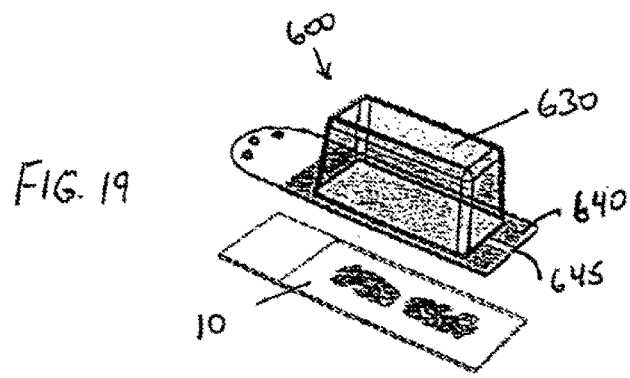
FIG. 19 is an exploded view of a slide holder flow cell and slide in accordance with certain embodiments.

FIG. 19 illustrates an embodiment where the adhesive 640 on the underside of the thermoformed slide holder flow cell 600 seals directly to the slide 10 surface. A small slit 645 in the adhesive 640 acts as a drain port. Soaking and rinsing fluids are introduced using the reservoir opening 630, allowing the flushing of compounds off the tissue section via vacuum on a vacuum manifold.

Figures 20A, 20B:
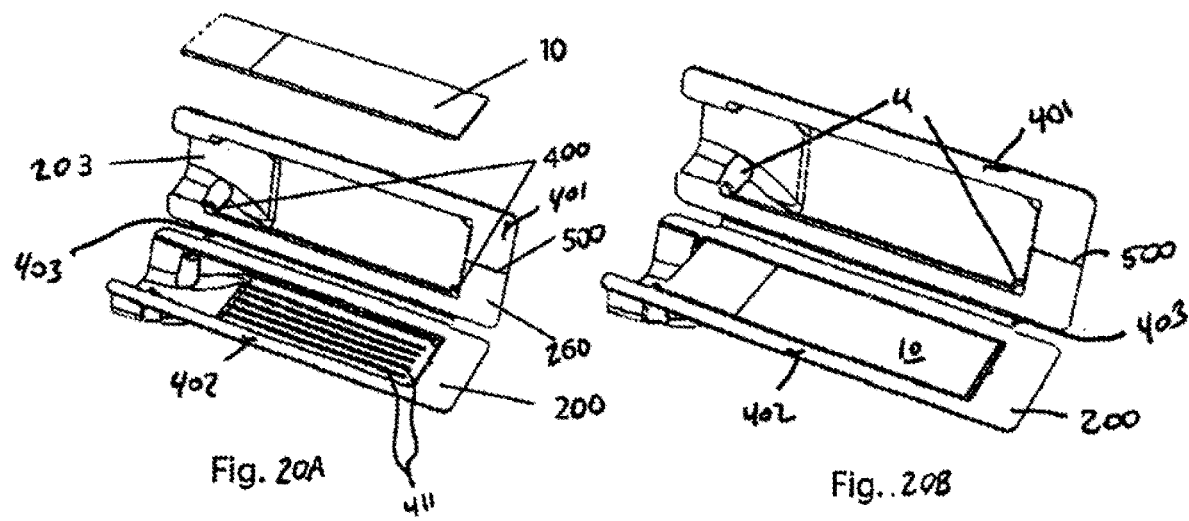
FIG. 20A is a perspective exploded view of a flow cell and slide in accordance with another embodiment.
FIG. 20B is a perspective view of the flow cell of FIG. 20A with a slide in place, in accordance with certain embodiments.
Figure 20C:
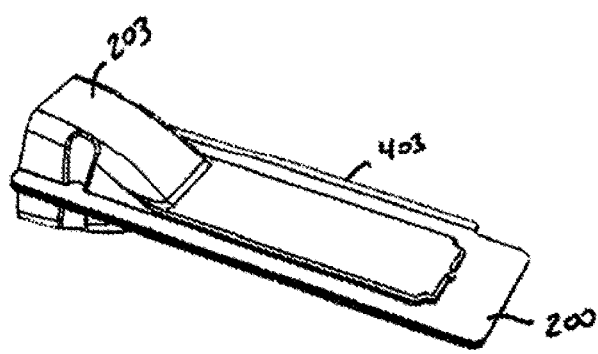
FIG. 20C is a perspective view of the flow cell of FIG. 20A in an assembled condition, in accordance with certain embodiments.

FIGS. 20A-20C illustrate a thermoform vertical embodiment. A standard tissue mounted glass slide 10 is constrained within a thermoformed slide holder flow cell 200, sealed with a semi-permanent fluid-proof adhesive 260, such as a silicone-based adhesive or acrylic adhesive. In certain embodiments, the thermoform has standoffs 400 in all four corners to allow a slight gap on the tissue side of the slide 10. A plurality of spaced longitudinal ribs 411 can be provided to provide added rigidity to the flow cell 200, and to provide a gap allowing proper drainage upon application of a driving force. When assembled, the thermoform 200 creates a gap in front of the tissue that allows reagents such as blocking agents, antibodies, stains, etc. to be in contact with the tissue, although rinse and soak solutions, for example, can be introduced from the reservoir 203 opening on the top. When a driving force such as vacuum is applied, the fluid is flushed from the slide through the capillary drain (e.g., a small slit) 500 in the adhesive, and down through a drain. In certain embodiments, the thermoform is formed from a first member 401 pivotally connected to a second member 402 by a hinge 403 to allow for quick assembly. Although in the embodiment shown the hinge 403 is shown along the longitudinal axis of the flow cell, in certain embodiments the hinge could be oriented at the base of the flow cell.

Figure 21:
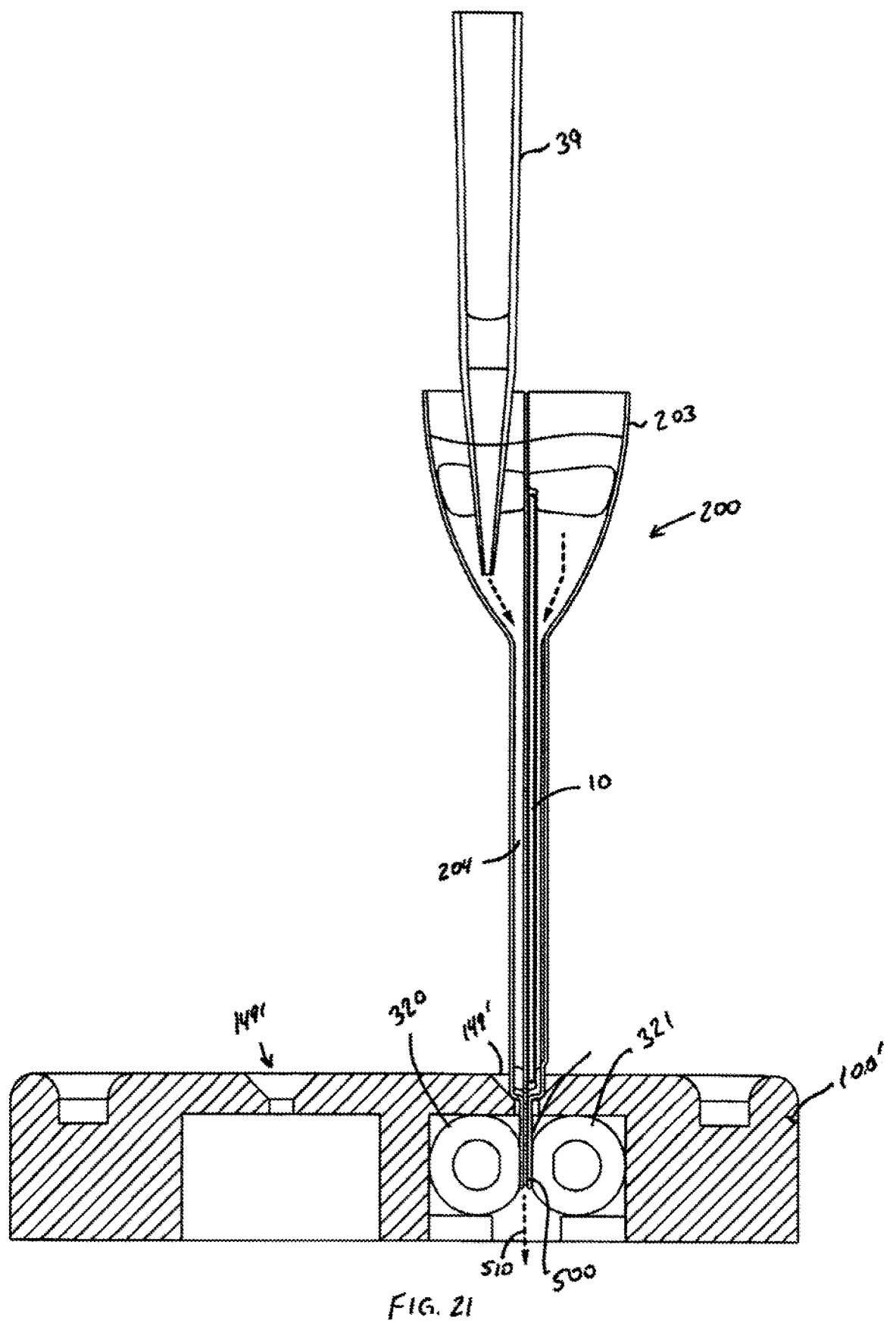
FIG. 21 is a schematic diagram of the flow cell of FIG. 20A shown positioned in a vacuum manifold in accordance with certain embodiments.
Figure 22:
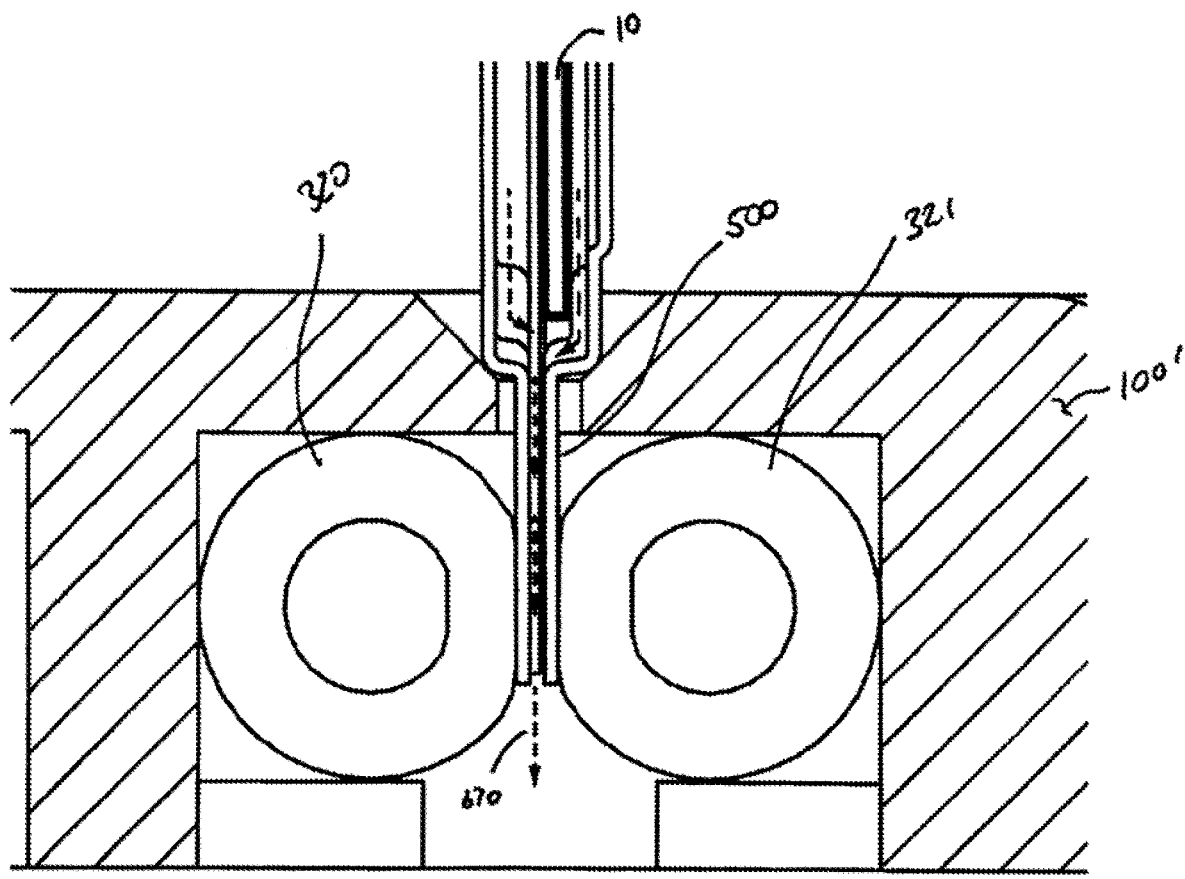
FIG. 22 is a schematic view of the lower region of the flow cell of FIG. 20A shown positioned in a vacuum manifold in accordance with certain embodiments.

As shown in FIGS. 21 and 22, the tip of a pipette 39 may introduce fluids such as antibodies and wash fluids, into the reservoir 203, the reservoir 203 being in fluid communication with the tissue chamber 204 that includes a known region for the fluids. The flow cell 200 is shown positioned in a vacuum manifold sealing assembly. In certain embodiments, the vacuum manifold 100' includes one or more flow cell receiving wells 149' that can include silicone tubing 320, 321 or the like. In certain embodiments, the flat thermoform slips between two tubes 320, 321, creating a seal around the thermoform assembly. When a driving force such as vacuum is applied, fluid drains out of the capillary drain 500 in the adhesive layer created by the sandwich of the thermoform and the adhesive, as illustrated by the dotted arrow 510 in FIGS. 21 and 22.

What is claimed is:

1. A sample holder, comprising:
   a fluid reservoir in communication with a sample chamber having a substrate and an outer perimeter;
   a gasket positioned on said substrate in said sample chamber, said gasket having a perimeter portion positioned about said outer perimeter and an inner portion spaced from said perimeter portion;
   a first port in fluid communication with said sample chamber via a fluid channel, said fluid channel being defined between said perimeter portion and said inner portion of said gasket positioned on said substrate in said sample chamber;
   a second port in fluid communication with said sample chamber; and
   a plurality of spaced clips configured to receive a sample substrate, wherein when said sample substrate is engaged in said sample holder, sample supported by said sample substrate is in said sample chamber.

2. The sample holder of claim 1, wherein said first port is configured to receive a pipette.

3. The sample holder of claim 1, wherein said sample substrate comprises a slide.

4. The sample holder of claim 1, wherein said first port is an injection or recovery port, and said second port is a drain port.

5. A sample holder, comprising:
   a fluid reservoir in communication with first and second sample chambers, each having a substrate and an outer perimeter;
   a first gasket positioned on said substrate in said first sample chamber, said first gasket having a perimeter portion positioned about said outer perimeter of said first sample chamber and an inner portion spaced from said perimeter portion;
   a first port in fluid communication with said first sample chamber via a first fluid channel, said first fluid channel being defined between said perimeter portion and said inner portion of said first gasket positioned on said substrate of said first sample chamber;

a second port in fluid communication with said first sample chamber;

a second gasket positioned on said substrate in said second sample chamber, said second gasket having a perimeter portion positioned about said outer perimeter of said second sample chamber and an inner portion spaced from said perimeter portion;

a third port in fluid communication with said second sample chamber via a second fluid channel, said second fluid channel being defined between said perimeter portion and said inner portion of said second gasket positioned on said substrate of said second sample chamber;

a first plurality of spaced clips configured to receive a first sample substrate, wherein when said first sample substrate is engaged in said sample holder, sample supported by said first sample substrate is in said first sample chamber; and a second plurality of spaced clips configured to receive a second sample substrate, wherein when said second sample substrate is engaged in said sample holder, sample supported by said second sample substrate is in said second sample chamber.

6. The sample holder of claim 5, wherein said first port is configured to receive a pipette.

7. The sample holder of claim 5, wherein said first and second sample substrates each comprises a slide.

8. The sample holder of claim 5, wherein said first port is an injection or recovery port, and said second port is a drain port.

* * * * *